(12) United States Patent
Lin et al.

(10) Patent No.: US 8,737,722 B2
(45) Date of Patent: May 27, 2014

(54) LOCOMOTION ANALYSIS METHOD AND LOCOMOTION ANALYSIS APPARATUS

(75) Inventors: Ta-Te Lin, Taipei (TW); Tai-Hsien Ou-Yang, Taipei (TW); Meng-Li Tsai, Taipei (TW); Chen-Tung Yen, Taipei (TW)

(73) Assignee: National Taiwan University, Taipei (TW)

( * ) Notice: Subject to any disclaimer, the term of this patent is extended or adjusted under 35 U.S.C. 154(b) by 370 days.

(21) Appl. No.: 13/247,015

(22) Filed: Sep. 28, 2011

(65) Prior Publication Data

US 2013/0034264 A1 Feb. 7, 2013

(30) Foreign Application Priority Data

Aug. 4, 2011 (TW) .............................. 100127788 A

(51) Int. Cl.
*G06K 9/00* (2006.01)
*G06T 15/00* (2011.01)

(52) U.S. Cl.
USPC .............................. 382/154; 382/100; 345/419

(58) Field of Classification Search
CPC ...................................................... G06K 9/00
USPC ......... 382/100, 103, 110, 128, 133, 134, 154; 348/143, 169–172; 345/419
See application file for complete search history.

(56) References Cited

U.S. PATENT DOCUMENTS

| | | | | |
|---|---|---|---|---|
| 7,330,584 B2 * | 2/2008 | Weiguo et al. | ................ | 382/154 |
| 7,835,568 B2 * | 11/2010 | Park et al. | ..................... | 382/154 |
| 8,306,260 B2 * | 11/2012 | Zhu et al. | ....................... | 382/103 |
| 8,340,422 B2 * | 12/2012 | Boughorbel | .................. | 382/173 |
| 8,401,276 B1 * | 3/2013 | Choe et al. | ..................... | 382/154 |
| 8,447,098 B1 * | 5/2013 | Cohen et al. | .................. | 382/154 |
| 2005/0063582 A1 * | 3/2005 | Park et al. | ..................... | 382/154 |
| 2011/0279697 A1 * | 11/2011 | Shingu et al. | ............. | 348/222.1 |

* cited by examiner

*Primary Examiner* — Sheela Chawan
(74) *Attorney, Agent, or Firm* — WPAT, PC; Justin King

(57) ABSTRACT

An exemplary locomotion analysis method includes steps of: acquiring a depth map including an image of a measured object, filtering out a background image of the depth map according to a depth threshold, finding out the image of the measured object from the residual image of the depth map, calculating three-dimensional (3D) coordinates of the measured object according to the image of the measured object has been found out, recording the 3D coordinates to reconstruct a 3D moving track of the measured object and performing a locomotion analysis of the measured object according to the 3D moving track. Moreover, an exemplary locomotion analysis apparatus applied to the above method also is provided.

8 Claims, 3 Drawing Sheets

LOCOMOTION ANALYSIS METHOD AND LOCOMOTION ANALYSIS APPARATUS

TECHNICAL FIELD

The present invention generally relates to the biomedicine field and, particularly to a locomotion analysis method and a locomotion analysis apparatus with high accuracy.

BACKGROUND

Nowadays, in the biological medical industry, life science research and agriculture animal technology, the animal locomotion analysis has become an indispensable work. In traditional locomotion analysis technology of animal behavior, most of solutions use manual method, sensor array or camera to obtain the location of a measured object, and then identifies the location of the measured object by manual analysis or automatic algorithm.

However, the manual manner not only is time-consuming and high-cost but also lack of objectivity. The use of sensor array (e.g. the resistive-type touch device or the capacitive-type touch device) would result in excessively large-sized analysis apparatus and unfriendly maintenance, and the price of such sensor array generally is expensive. Additionally, in the situation of single camera being used to obtain the location of the measured object, only the two-dimensional location of the measured object can be obtained and it is easily interfered by the light shadow change and background factors. If multiple cameras are used to obtain the location of the measured object, it is still difficult to obtain the third-dimensional location of the measured object resulting from the synchronization problem, and also is difficult to obtain the pose information of the measured object at the side facing away from the camera for pose reconstruction resulting from the limited field of view of the camera. Accordingly, it is difficult to achieve accurate 3D moving track and pose reconstruction.

SUMMARY OF EMBODIMENTS

Therefore, an objective of the present invention is to provide a locomotion analysis method, capable of automatically and accurately detecting a three-dimensional (3D) moving track of a measured object for locomotion analysis.

Another objective of the present invention is to provide a locomotion analysis apparatus with low cost.

More specifically, a locomotion analysis method in accordance with an exemplary embodiment includes following steps of: acquiring a depth map including an image of a measured object, filtering out a background image of the depth map by use of a depth threshold, then finding out the image of the measured object from the residual image of the depth map, calculating 3D coordinates of the measured object according to the image of the measured object has been found out, recording the 3D coordinates to reconstruct a 3D moving track of the measured object, and performing a locomotion analysis of the measured object according to the 3D moving track.

In one exemplary embodiment, before the step of finding out the image of the measured object from the residual image, the locomotion analysis method further includes a step of performing a noise reduction operation to filter out noise points in the residual image.

In one exemplary embodiment, the step of performing a noise reduction operation includes sub-steps of: finding out the noise points in the residual image by use of an object size threshold, and filtering out the noise points have been found out.

In one exemplary embodiment, the step of finding out the image of the measured object from the residual image includes sub-steps of: labeling the residual image of the depth map by using a connected-component labeling algorithm to obtain multiple labeled sections, determining whether one of the labeled sections is matched with the measured object, and regarding the corresponding labeled section as the image of the measured object.

In one exemplary embodiment, the step of determining whether one of the labeled sections is matched with the measured object includes determining each of the labeled sections whether has a size and a shape matched with that of the measured object.

In one exemplary embodiment, the step of calculating the 3D coordinates of the measured object includes sub-steps of: calculating a mass center o gravity center of the measured object, and calculating the 3D coordinates of the measured object according to the mass center or gravity center.

In one exemplary embodiment, the locomotion analysis method further includes a step of: performing a partial feature analysis to the measured object according to the mass center or gravity center to reconstruct a pose of the measured object.

A locomotion analysis apparatus in accordance with another exemplary embodiment includes a 3D image capture device and a computer device. The 3D image capture device is configured (i.e., structured and arranged) for sensing a measured object to obtain a depth map including an image of the measured object. The computer device is electrically/electronically connected to the 3D image capture device, and is configured for acquiring the depth map, filtering out a background image of the depth map by use of a depth threshold, finding out the image of the measured object from the residual image of the depth map and calculating 3D coordinates of the measured object according to the image of the measured object has been found out. The computer device is further configured for recording the calculated 3D coordinates to reconstruct a 3D moving track of the measured object and performing a locomotion analysis of the measured object according to the 3D moving track.

In one exemplary embodiment, the computer device is further configured for performing a noise reduction operation to filter noise points in the residual image before finding out the image of the measured object.

In one exemplary embodiment, when the computer device performs the noise reduction operation, the noise points are found out by use of an object size threshold, and then the noise points have been found out are filtered out.

In one exemplary embodiment, during finding out the image of the measured object from the residual image, the computer device labels the residual image of the depth map by using a connected-component labeling algorithm to obtain multiple labeled sections, determines whether one of the labeled sections is matched with the measured object, and regards the corresponding labeled section as the image of the measured object.

In one exemplary embodiment, when the computer device determines whether one of the labeled sections is matched with the measured object, each of the labeled sections is determined whether has a size and a shape matched with that of the measured object.

In one exemplary embodiment, when the computer device calculates the 3D coordinates of the measured object, a mass center or gravity center of the image of the measured object is firstly calculated and the 3D coordinates of the measured object are then calculated according to the mass center or gravity center.

In one exemplary embodiment, the computer device is further configured for performing a partial feature analysis to the measured object according to the mass center or gravity center to reconstruct a pose of the measured object.

In one exemplary embodiment, the 3D image capture device includes a depth camera.

In short, in the solution proposed by the present invention for solving the problems in the prior art, a depth map including an image of a measured object is firstly acquired and a background image of the depth map then is filtered out by use of a depth threshold. Subsequently, the image of the measured image is found out from the residual image of the depth map and 3D coordinates of the measured object are calculated according to the image of the measured object has been found out. Afterwards, the calculated 3D coordinates are recorded to reconstruct a 3D moving track of the measured object and then a locomotion analysis of the measured object is performed according to the 3D moving track. Accordingly, as long as the locomotion analysis apparatus is designed according to the above operation manner, the locomotion analysis apparatus can automatically and accurately detect the 3D moving track of the measured object for locomotion analysis.

BRIEF DESCRIPTION OF THE DRAWINGS

The above objectives and advantages of the present invention will become more readily apparent to those ordinarily skilled in the art after reviewing the following detailed description and accompanying drawings.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

Figure 1:
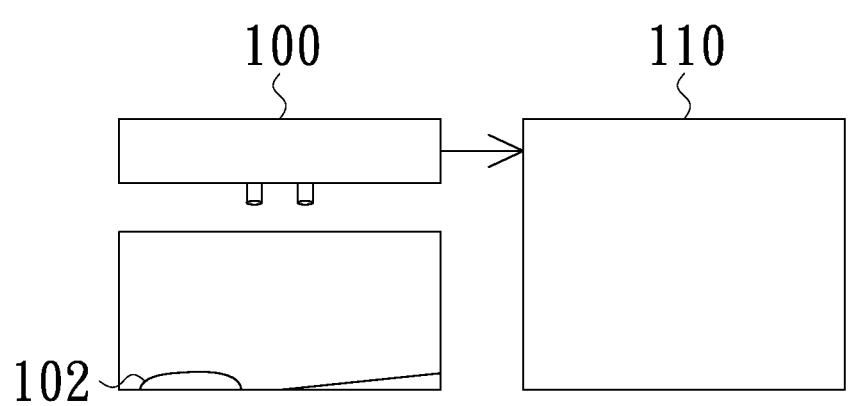
FIG. 1 is a schematic structural view of a locomotion analysis apparatus according to an exemplary embodiment.

FIG. 1 is a schematic structural view of a locomotion analysis apparatus 10 in accordance with an exemplary embodiment. As illustrated in FIG. 1, the locomotion analysis apparatus 10 includes a three-dimensional (3D) image capture device 100 and a computer device 110. The 3D image capture device 100 is configured (i.e., structured and arranged) for sensing a measured object 102 to obtain a depth map including an image of the measured object 102. The computer device 110 is electrically/electronically connected to the 3D image capture device 100 to acquire the depth map. In the exemplary embodiment, the measured object 102 for example is a mouse, and the 3D image capture device 100 for example is a depth camera.

After the depth map is acquired, the computer device 110 filters out a background image in the depth map by use of a depth threshold. After the background image in the depth map is filtered out, the computer device 110 would selectively implement a noise reduction operation for filtering out noise points in the residual image of the depth map. When the computer device 110 selectively implements the noise reduction operation, the computer device 110 finds out the noise points from the residual image according to an object size threshold and removes the noise points have been found out. Subsequently, the computer device 110 finds out the image of the measured object 102 from the residual image of the depth map and calculates 3D coordinates of the measured object 102 according to the image of the measured object 102 has been found out. In the exemplary embodiment, when the computer device 110 finds the image of the measured object 102, a connected-component labeling algorithm can be used to label the residual image of the depth map to generally obtain multiple labeled sections, and each of the labeled section in the residual image is determined whether is matched with the measured object 102 or not, for example, each of the labeled sections in the residual image is determined whether has a size and a shape matched with that of the image of the measured object 102. If it is determined that one of the labeled sections in the residual image is matched with the image of the measured object 102, the computer device 110 regards the matched labeled section in the residual image as the image of the measured object 102. Herein, the connected component labeling algorithm can be considered as a process of labeling all connected subsets in a binary image set, and each of the label sections is a subset of connected pixels.

After the image of the measured object 102 is found out, the computer device 110 calculates the 3D coordinates of the measured object 102 according to the image of the measured object 102 has been found out. In the exemplary embodiment, the computer device 110 firstly calculates the mass center or gravity center of the image of the measured object 102, and then calculates the 3D coordinates of the measured object 102 according to the mass center or gravity center. The computer device 110 further records the calculated 3D coordinates to reconstruct a 3D moving track of the measured object 102, and then performs a locomotion analysis of the measured object 102 according to the 3D moving track.

Additionally, after the mass center or gravity center of the image of the measured object 102 is calculated, the computer device 110 can obtain at least a part of the outline of the measured object 102 according to the mass center or gravity center to perform a partial feature analysis to the image of the measured object 102, so as to reconstruct the pose of the measured object 102.

Figure 2A:
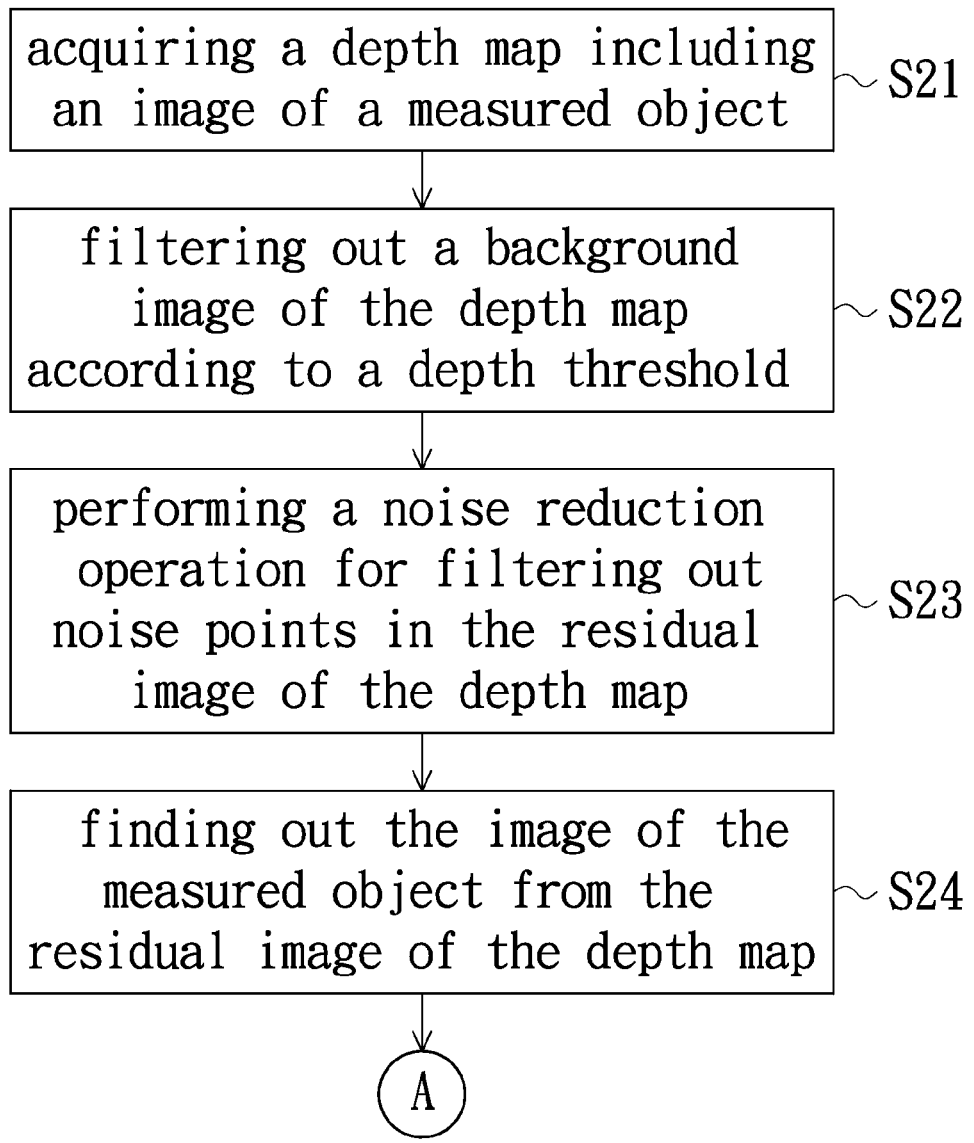
FIGS. 2A and 2B are a schematic flowchart of a locomotion analysis method according to an exemplary embodiment.
Figure 2B:
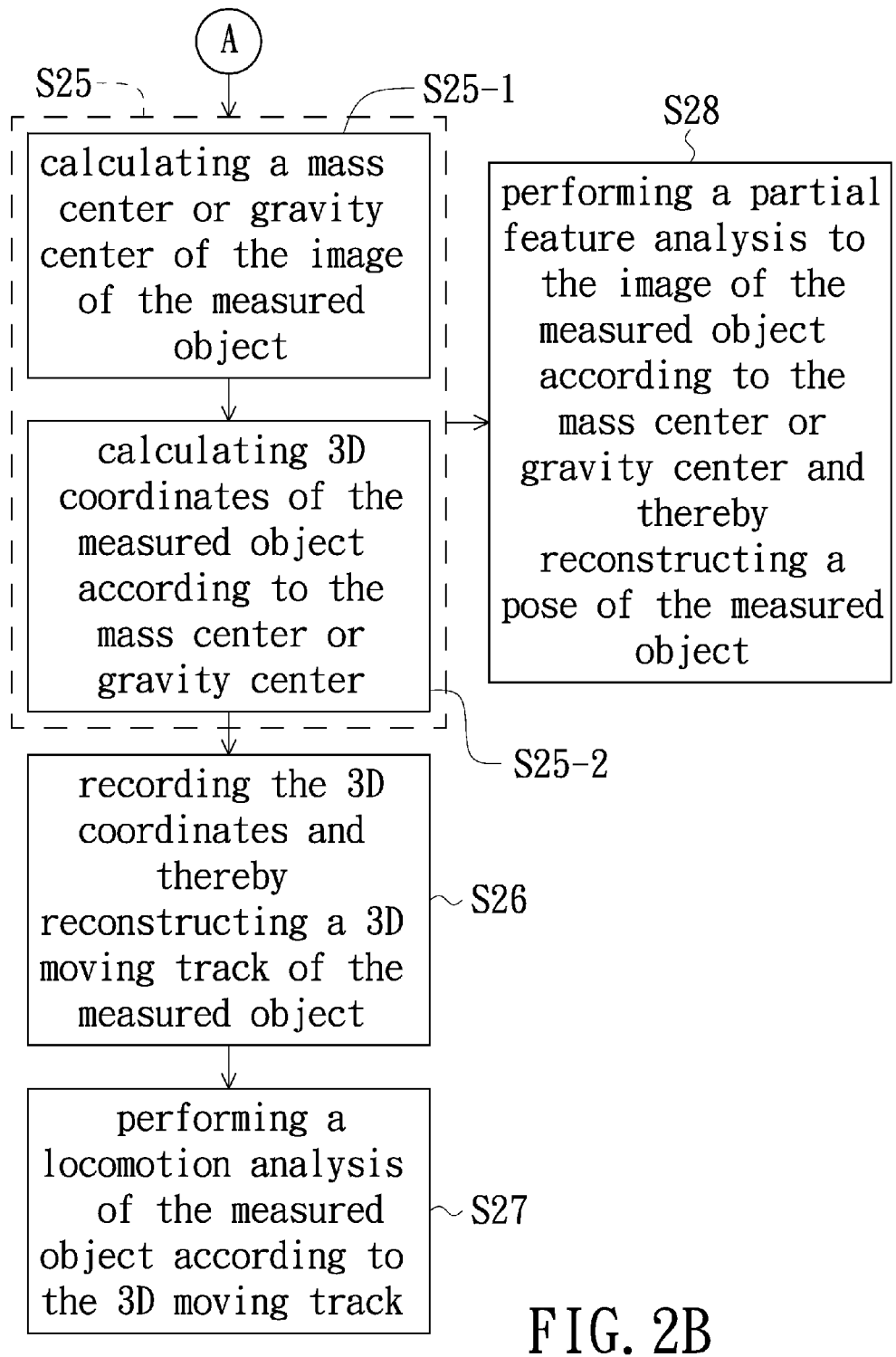

According to the description of the above exemplary embodiments, several basic operation steps of the locomotion analysis apparatus 10 can be summarized as illustrated in FIGS. 2A and 2B. FIGS. 2A and 2B are a schematic flowchart of a locomotion analysis method applying to the locomotion analysis apparatus 10 in accordance with an exemplary embodiment. As illustrated in FIGS. 2A and 2B, the locomotion analysis method includes several steps as follows. Firstly, as shown in step S21, a depth map including an image of a measured object is acquired. Subsequently, as shown in step S22, a background image of the depth map is filtered out by use of a depth threshold. Afterwards, as shown in step S23, a noise reduction operation is performed to filter noise points in the residual image. Then, as shown in step S24, the image of the measured object is found out from the residual image of the depth map. Thereafter, as shown in step S25, 3D coordinates of the measured object are calculated according to the image of the measured object has been found out. Moreover, the step S25 may include two sub-steps S25-1, S25-2. In the sub-step of S25-1, a mass center or gravity center of the image of the measured object is firstly calculated, and then in the sub-step S25-2, the 3D coordinates of the measured object are calculated according to the calculated mass center or gravity center. Next, as shown in step S26, the 3D coordinates are recorded to reconstruct a 3D moving track of the measured object. Finally, as shown in step S27, a locomotion analysis of the measured object is performed according to the 3D moving track. After completing the step S25, a partial feature analysis can be further performed to the image of the measured object according to the calculated mass center or gravity center to reconstruct the pose of the measured object, as shown in step S28.

Sum up, in the solution proposed by the present invention for solving the problems in the prior art, a depth map including an image of a measured object is firstly acquired and a background image of the depth map then is filtered out by use of a depth threshold. Subsequently, the image of the measured image is found out from the residual image of the depth map and 3D coordinates of the measured object are calculated according to the image of the measured object has been found out. Afterwards, the calculated 3D coordinates are recorded to reconstruct a 3D moving track of the measured object and then a locomotion analysis of the measured object is performed according to the 3D moving track. Accordingly, as long as the locomotion analysis apparatus is designed to be matched with the above operation manner, the locomotion analysis apparatus can automatically and accurately detect the 3D moving track of the measured object for locomotion analysis.

Since the locomotion analysis apparatus proposed by the present invention can automatically implement locomotion analysis, the issues of time-consuming and lack of objectivity caused by manual analysis are solved consequently. Compared with the use of expensive sensor array technology, the locomotion analysis apparatus proposed by the present invention has the advantages of low cost, small volume and maintenance friendly. Moreover, since the locomotion analysis apparatus proposed by the present invention can use a depth camera to obtain the third-dimensional location of the measured object and filter out the background and noise in the depth map, which solves the problems that the conventional single camera only can obtain the two-dimensional location of the measured object and easily is interfered by light shadow change and background factors. Compared with the use of conventional multiple cameras technology, the locomotion analysis apparatus proposed by the present invention can be operative with single depth camera, and thus is without the synchronization problem and not limited by the view field of the camera. Accordingly, the locomotion analysis apparatus proposed by the present invention would achieve higher accuracy of 3D locomotion and pose reconstruction of measured object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A locomotion analysis apparatus comprising:
a three-dimensional image capture device, configured for sensing a measured object to obtain a depth map including an image of the measured object; and
a computer device, electronically connected to the three-dimensional image capture device, configured for acquiring the depth map, filtering out a background image of the depth map according to a depth threshold, then finding out the image of the measured object from the residual image of the depth map, calculating three-dimensional coordinates of the measured object according to the image of the measured object has been found out, recording the three-dimensional coordinates to reconstruct a three-dimensional moving track of the measured object and performing a locomotion analysis of the measured object according to the three-dimensional moving track.

2. The locomotion analysis apparatus according to claim 1, wherein the computer device is further configured for performing a noise reduction operation for filtering noise points in the residual image before finding out the image of the measured object from the residual image.

3. The locomotion analysis apparatus according to claim 2, wherein when the computer device performs the noise reduction operation, the noise points in the residual image are found out according to an object size threshold and then are filtered out.

4. The locomotion analysis apparatus according to claim 1, wherein when the computer device finds the image of the measured object from the residual image, the computer device labels the residual image of the depth map by a connected-component labeling algorithm to obtain a plurality of labeled sections, determines whether one of the labeled sections is matched with the measured object and regards the matched labeled section as the image of the measured object.

5. The locomotion analysis apparatus according to claim 4, wherein when the computer device determines whether one of the labeled sections is matched with the measured object, the computer device determines whether each of the labeled sections has a size and a shape matched with that of the measured object.

6. The locomotion analysis apparatus according to claim 1, wherein when the computer device calculates the three-dimensional coordinates of the measured object, the computer device firstly calculates a mass center or gravity center of the image of the measured object and then calculates the three-dimensional coordinates of the measured object according to the mass center or gravity center.

7. The locomotion analysis apparatus according to claim 6, wherein the computer device is further configured for performing a partial feature analysis to the image of the measured object according to the mass center or gravity center to reconstruct a pose of the measured object.

8. The locomotion analysis apparatus according to claim 1, wherein the three-dimensional image capture device comprises a depth camera.

* * * * *